April 28, 1931.   J. BOZOWICH   1,802,497
COUPLING
Filed Feb. 14, 1927

INVENTOR.
John Bozowich

Patented Apr. 28, 1931

1,802,497

UNITED STATES PATENT OFFICE

JOHN BOZOWICH, OF SAN FRANCISCO, CALIFORNIA

COUPLING

Application filed February 14, 1927. Serial No. 168,077.

One object of my invention is to provide a coupling durable and reliable in its use.

Another object is to provide a coupling by which matter through it can be turned to flow or shut off at the same instant and with the same operation.

Still another object is to provide a coupling which can be used anywhere where instant coupling is desired.

Further objects will hereafter appear.

The invention consists of the construction, combination and arrangement of parts as hereafter more fully described and claimed, with reference to the accompanying drawing, showing two figures illustrating the invention completely, in which:

Figure 1:
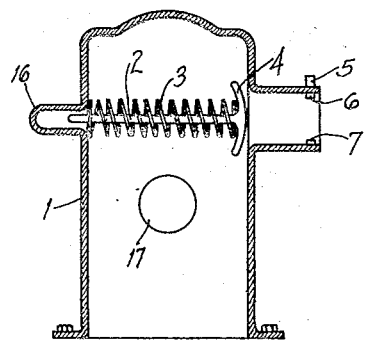
Fig. 1 is a side elevation of a city fire department water hydrant cut to show my improvement as one part of the coupling.
Figure 2:
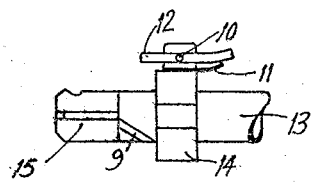
Fig. 2 is a side view of the other part showing the hose end.

To construct this kind of coupling it is not absolutely necessary to construct Fig. 1 as here shown, but it is necessary to have that part of it which we will call a female part shown as part of a fire hydrant 1 and in which Fig. 2, the male part, will be inserted.

This female part consists of a coupling element provided with lugs 5, 6, and 7, spring 3, and piston 2, with shut off 4 and guide 16.

Fig. 2, the male part, is constructed principally as shown with another groove opposite groove 9.

A gasket of rubber or other material is attached to the male or female member to prevent leakage and it will also serve to keep in place the inner locking means, lug 6 and inner end of groove 9.

Another locking means is located on the outside of the coupling consisting of lever 12, spring 11, pivot 10 and lug 5. The bulk of this locking means can be reduced by cutting lever 12 behind pivot 10 so lever 12 may be thrown back and forth by a finger.

Spring 11 may or may not be put under the lever, in this case.

Assuming that the parts are constructed and the operation is desired, Fig. 1 is full of water shut off by 4, and it is desired to have the water flow through the hose Fig. 2.

Male part Fig. 2 is now taken and the end 15 inserted in female part with the lugs 6 and 7 engaging in the grooves 9.

The groove shown will touch knob 6 and the opposite groove knob 7.

At this move the frame of the end 15 touches shutoff 4. Then the male part is pushed inwardly twisting to the right. This move presses shut off 4 back and allows water to enter end 15 which is connected to hose 13 and out it flows.

At this time inner end of groove 9 is reached by lugs 6 and 7.

Locking on the inside is now made but there is the other outside locking means which has also locked the coupling by lever 12 passing over knob 5 and settled there.

The coupling is then completed.

When it is desired to uncouple and shut off the water the hose part is again taken and turned to the left pressing on lever 12 above spring 11 to unlock outer lock also pushing in a little to unlock inner locking at end of 9 and 6 which is being held by expansion of the aforementioned gasket.

The hose part will then readily come out and the water is shut off by spring 3 pushing shut off 4 in its place. On constructing this coupling it is not necessary to have it precisely as shown and described but it is imperative to have essentials of the invention such as grooves 9, lugs 6 and 7.

Having thus described my invention, I claim as my invention:

A valved pipe coupling comprising male and female members, said female member being provided with lugs on its inner surface, said male member being provided with inclined grooves adapted to coact with said lugs to draw said members together upon relative rotation thereof, a valve in said female member, a spring normally urging said valve into seated position, a reduced perforated extension on said male member adapted to contact with and open said valve upon coupling of the members, and a latch to retain said members in coupled relation, said latch comprising an external lug on the female member and a spring-pressed lever on said male member, the extremity of which is adapted to engage behind said external lug when said members are in coupled position.

JOHN BOZOWICH.